3,579,291
REMOVING PHENYL AZIDE FROM GASES
Winfried Ludwig and Rudolf Oster, Ludwigshafen, and Hans Urbach, Lampertheim, Germany, assignors to Badische Anilin- & Soda-Fabrik Aktiengesellschaft, Ludwigshafen (Rhine), Germany
No Drawing. Filed Dec. 3, 1969, Ser. No. 881,898
Claims priority, application Germany, Dec. 13, 1968, P 18 14 493.9
Int. Cl. B01d 47/02
U.S. Cl. 23—2        3 Claims

ABSTRACT OF THE DISCLOSURE

A process for removing phenyl azide from gas by passing the gas containing phenyl azide through 50 to 100 wt. percent sulfuric acid.

---

The invention relates to a process for removing phenyl azide from gases by means of concentrated sulfuric acid.

Among the decomposable organic compounds, the low molecular weight azides come very close to known explosives in their explosibility, the brisance being only slightly weaker than that of nitrocellulose.

An industrial process in which the formation of phenyl azide cannot be avoided is therefore only realizable if it is possible to remove phenyl azide in an economical and harmless manner.

Phenyl azide is formed for example by the action of nitrous acid on phenylhydrazine in acid solution or in the reaction of phenyl diazonium chloride with phenyl hydrazine.

It is therefore understandable that phenyl azide should be formed as a byproduct in the known industrial synthesis of phenyl hydrazine in which phenyl diazonium chloride is reduced with sodium bisulfite.

According to German printed application No. 1,235,935, phenyl hydrazine and its salts can be prepared by continuous reduction from phenyl diazonium chloride by initiating the reduction at low temperatures using as the reducing agent an excess of at least 30% by weight of sodium bisulfite and then completing the reduction at temperatures of up to 150° C.

In this process it is impossible to avoid the formation of up to 0.6% by weight of phenyl azide with reference to the aniline used.

Slufur dioxide is used in excess and is expelled by steam from the resultant phenyl hydrazine solution.

Since the economy of this method depends largely on the recovery of the sulfur dioxide gas and strong contamination of waste aqueous liquors by sulfur dioxide is not permissible, this has to be returned to the process as sodium disulfate after it has been absorbed in caustic soda solution. Since phenyl azide is volatile in steam, it is present in the sulfur dioxide and consequently in the sodium bisulfite solution in which it is insoluble.

We have now found that sulfur dioxide gas containing phenyl azide can be freed from phenyl azide by passing it through a washing column which contains sulfuric acid having a content of from 50 to 100% by weight of $H_2SO_4$.

It was not to be foreseen and is surprising even to those skilled in the art that gaseous phenyl azide can be removed with concentrated sulfuric acid in commercial plant at the conventional gas velocities of about 0.2 to 4.0 m./sec. so efficiently that phenyl azide cannot be detected at the outlet from the column. It has been found that gaseous phenyl azide is degraded by concentrated sulfuric acid with the liberation of elementary nitrogen.

The phenyl azide may be contained in the gas in a concentration of up to the saturation concentration, i.e., for example about 5 g. per meter (STP) at room temperature. If the content of phenyl azide exceeds the saturation concentration at room temperature, it separates in the form of small oily droplets which are also readily degraded in the concentrated sulfuric acid provided entrainment of the droplets by the gas stream is ensured.

An advantageous embodiment of the process consists in causing the gas containing the azide to flow upwardly in a washing column countercurrent to the recycled sulfuric acid, an amount of fresh concentrated sulfuric equivalent to the spent sulfuric acid being introduced into the upper portion of the washing column and the spent acid being removed at the column bottoms by means of an overflow. The sulfuric acid is advantageously recycled with a pump.

Heat is evolved in the reaction of phenyl azide with sulfuric acid this is advantageously not removed but utilized for heating up the sulfuric acid so that the reaction rate is increased. The optimum reaction temperature is dependent on the sulfuric acid concentration. It is advantageous to use concentrated sulfuric acid at room temperature; when using 85% by weight sulfuric acid, the temperature should be from 50° to 60° C. This temperature is set up automatically if the heat of reaction liberated is not removed. The useful temperature range is from room temperature to 150° C. The concentration of the sulfuric acid is from 50 to 100% by weight and the reaction velocity increases with the concentration of the acid. The latter should be high enough to effect quantitative removal of the phenyl azide with the given apparatus and at the given rate of flow. Sulfuric acid having less than 50% by weight of $H_2SO_4$ is therefore generally not suitable for the process according to this invention. The process according to the invention may be carried out at atmospheric or superatmospheric pressure.

After the gas containing sulfur dioxide has passed through the washing column, it is passed into an absorber operated with caustic soda solution. A sodium bisulfite solution is thus obtained which is devoid of phenyl azide and which can be used in the prior art method.

Degradation of phenyl azide is also possible in other carrier gases, for example in nitrous gases, steam or air.

The following example illustrates the invention.

EXAMPLE

A glass scrubbing column having an internal diameter of of 450 mm. contains ceramic rings having a diameter of 35 mm. up to a height of 2 m. A ceramic circulating pump is attached at the bottom of the column, the pressure side of the pump leading to the top of the column. Concentrated sulfuric acid is supplied through a flow controller into the pressure side of the pump line. The level of the liquid in the scrubbing column is controlled by means of an overflow at the bottom of the column. The temperature of the circulated sulfuric acid is measured in the column bottoms.

200 cubic meters (STP) of sulfur dioxide which contains from 3000 to 5000 mg. of phenyl azide per cubic meter (STP) is passed into the column per hour. The column is charged with 8 cubic meters of washing liquid per hour 22 liters per hour of 96% sulfuric acid is supplied to the washing liquid and the same amout of washing liquid is removed at the overflow. The density of the washing liquid is about $d_{20}=1.81$ kg. per liter. The temperature set up is 58° C. The content of phenyl azide in the purified sulfur dioxide lies below detectable limits.

The column was operated in the manner described for 120 days without any diminution in the purification effect being detected.

We claim:
1. A process for removing phenyl azide from gases wherein the gas containing phenyl azide is pased through a scrubbing column containing sulfuric acid having a content of from 50 to 100% by weight of $H_2SO_4$.
2. A process as claimed in claim 1 wherein 96% by weight sulfuric acid is used.
3. A process as claimed in claim 1 wherein scrubbing is carried out at a temperature of from 50° to 60° C.

References Cited

UNITED STATES PATENTS 3,203,989   8/1965   Hupfer _____ 260—569
3,410,900  11/1968   Kindler et al. _____ 260—569

REUBEN FRIEDMAN, Primary Examiner

R. W. BURKS, Assistant Examiner

PO-1050
(5/69)

UNITED STATES PATENT OFFICE
CERTIFICATE OF CORRECTION

Patent No. 3,579,291          Dated May 18, 1971

Inventor(s) Winfried Ludwig et al

It is certified that error appears in the above-identified patent and that said Letters Patent are hereby corrected as shown below:

Column 1, line 51, "Slufur" should read -- Sulfur --; line 57, "disulfite" should read -- bisulfite --.

Column 2, line 13, "slfuric" should read -- sulfuric --; line 18, "acid this" should read -- acid and this --.

Signed and sealed this 31st day of August 1971.

(SEAL)
Attest:

EDWARD M. FLETCHER, JR.        ROBERT GOTTSCHALK
Attesting Officer              Acting Commissioner of Patents